United States Patent [19]

Ohkawa

[11] Patent Number: 5,216,653
[45] Date of Patent: Jun. 1, 1993

[54] DRIVING DEVICE FOR OBJECTIVE LENS
[75] Inventor: Yukitoshi Ohkawa, Kakuda, Japan
[73] Assignee: Alps Electric Co., Ltd., Tokyo, Japan
[21] Appl. No.: 705,825
[22] Filed: May 28, 1991
[30] Foreign Application Priority Data
Jul. 24, 1990 [JP] Japan .................................. 2-78466
[51] Int. Cl.⁵ ............................................... G11B 7/00
[52] U.S. Cl. .............................. 369/44.15; 369/44.16; 359/554; 359/823
[58] Field of Search ................ 369/44.14, 44.15, 44.16, 369/44.19, 44.22, 247, 244, 253; 359/554, 811, 819, 822, 823

[56] References Cited
U.S. PATENT DOCUMENTS
4,661,943 4/1987 Ikeda ................................. 369/44.16
4,818,066 4/1989 Nose .................................. 369/44.16

FOREIGN PATENT DOCUMENTS
63-124232 5/1988 Japan ................................. 369/44.15
1-37733 2/1989 Japan ................................. 369/44.16
3-59823 3/1991 Japan ................................. 369/44.16

Primary Examiner—Aristotelis Psitos
Assistant Examiner—Nabil Hindi
Attorney, Agent, or Firm—Guy W. Shoup; David W. Heid

[57] ABSTRACT

A pickup device having a pickup body disposed in opposition with a disk and supported by plate-shaped elastic support members in such a manner as to be movable relative to a fixed portion. An end portion of each elastic support member is superimposed on a portion of the pickup body or the fixed portion or both, with an adhesive between the overlaps. The elastic support member includes a plurality of through holes arranged in a widthwise line and formed in a boundary portion between a stationary portion and a displaceable portion of the member. During assembly, when the adhesive applied at an end portion of each elastic support member is subjected to pressure, a part of the adhesive is forced into the through holes, thereby enabling an initial bond strength to be easily achieved, while preventing the adhesive from spreading beyond the region of application.

2 Claims, 4 Drawing Sheets

DRIVING DEVICE FOR OBJECTIVE LENS

BACKGROUND OF THE INVENTION

1. Field of the Invention

The present invention relates to a pickup device for use in a disk player such as a compact disk player.

2. Description of Related Art

Among conventional pickup devices, there are devices having a structure such as that shown in FIGS. 6, 7, 8A and 8B. Such a pickup device includes, as shown in an exploded perspective view in FIG. 6, a fixed portion 1 in the associated disk player, and four elastic support members 2, such as plate spring members, which each have a first end portion secured to the fixed portion 1, a second end portion secured to a pickup body 3 and a displaceable portion therebetween. The pickup body 3, to which the second end portions of the elastic support members 2 are secured, has an objective lens 3a on the upper (as viewed in FIG. 6) surface thereof. Focusing windings 4 are mounted on two opposing side surfaces of the pickup body 3.

Focusing members 7 are provided on another fixed portion of the disk player 1 in correspondence with the focusing windings 4. Each focusing member 7 comprises a plate-shaped magnet 5 and a U-shaped yoke 6, the magnet 5 being secured to one of the free-end sections of the yoke 6. Each of the focusing windings 4 is loosely fit in the gap between two opposing free-end sections of the corresponding focusing member 7 so that the pickup body 3 is controlled to move in the direction of the arrow A shown in FIG. 6.

Each of the elastic support members 2 has its two end portions secured to the pickup body 3 and the fixed portion 1 by an ultraviolet-curing adhesive 8 (abbreviated to "adhesive" throughout the specification unless otherwise specified). The adhesive 8 is used to meet the requirements that the entire structure should be made light and simple. The ultraviolet-curing adhesive 8 has the characteristic of instantaneously curing upon the radiation of ultraviolet light, and gradually curing with the passage of time.

An end portion of each elastic support member 2 is secured to the pickup body 3 or the fixed portion 1 by the adhesive 8 in the following manner. Before the elastic support member is overlapped with the pickup body 3 or the fixed portion 1, a quantity of the adhesive 8 is coated on the two end portions of each elastic support member 2. Then, one of the coated portions of the member 2 is contacted, under pressure, with a portion of the upper or lower surface of the pickup body 3.

However, with this state of the contacted portion, even when ultraviolet light is radiated from an upper position as viewed in FIG. 6, the adhesive positioned between the pickup body 3 and the elastic support member 2 cannot be irradiated with the ultraviolet light and, hence, cannot be instantaneously cured. For this reason, the conventional practice has been adapted to achieve an initial bond strength in the following manner. As shown in FIGS. 8A (a side view of a securing portion where an elastic support member 2 is secured to the pickup body 3) and FIG. 8B (an enlarged top view of the securing portion), a further quantity of the adhesive 8 is coated in such a manner as to keep it on a region including the pertinent end of the elastic support member 2, and the heaped adhesive is irradiated with ultraviolet light to be instantaneously cured. Then, that fraction of the adhesive 8 applied between the elastic support member 2 and the pickup body 3 is allowed to cure with the passage of time.

If an initial bond strength is achieved in this manner, it is possible to start the subsequent processes before all of the applied adhesive is cured; this is advantageous in that the time required for manufacturing the pickup device can be decreased.

However, the above-described art entails a problem. When an elastic support member 2, partially coated with a quantity of adhesive 8, is contacted with the pickup body 3 under pressure, a part of the adhesive 8 is pushed out to a displaceable portion 2a of the member 2, as denoted by 8a and 8b in FIG. 7 (a fragmentary side view of the pickup body 3). Pushed out adhesive portions, such as 8a and 8b, disturb the displacement characteristic of the displaceable portions 2a of the elastic support members 2 to make it into a non-linear characteristic. In addition, the pushed out adhesive portions cause a deviation in the center frequency of the portions 2a.

Another problem is that, if, in order to achieve an initial bond strength, the conventional practice is adopted and a further quantity of adhesive 8 is applied by keeping it on a region including the end of each elastic support member 2, this necessitates the consumption of an additional amount of adhesives. In addition, the external appearance of the pickup device is spoiled, thereby lowering the value of commodity of the device.

SUMMARY OF THE INVENTION

In view of the above-described problems, the present invention is directed to providing a pickup device for use in a disk player, in which an initial bonding strength is achieved with ease and without spoiling the external appearance, and in which the adhesive is prevented from spreading beyond the region where it is applied.

In order to achieve said object, the present invention provides a pickup device having a pickup body disposed in opposition with a disk and supported by plate-shaped elastic support members in such a manner as to be movable relative to a fixed portion. The pickup device is characterized in that an end portion of each elastic support member is superimposed on a portion of at least one component selected from the group consisting of the pickup body and the fixed portion, with an adhesive between the overlaps of the elastic support member and the selected component, the elastic support member having a stationary portion, a displaceable portion and a plurality of through holes formed in a boundary portion between the stationary portion and the displaceable portion, the through holes being arranged across the width of the elastic support member.

The pickup device having the above-specified structure is assembled in the following manner. A quantity of the ultraviolet-curing adhesive is coated on two end portions of each elastic support member. One of the coated end portions is attached to the pickup body under pressure, and the other to the fixed portion. In this process, the adhesive coated on each end portion is subjected to attachment pressure which in a conventional pickup device, may force a part of the adhesive to spread beyond the region where the adhesive is applied. However, in the pickup device according to the invention this spreading part of the adhesive is forced into the through holes linearly arranged in and formed in the boundary portion between the stationary portion and the displaceable portion of the elastic support member.

Therefore, no part of the adhesive spreads beyond the region where it is applied. When the adhesive, a part of which is forced into the through holes, is irradiated with ultraviolet light, that part of the adhesive forced into the through holes quickly cures, thereby providing an initial bond strength. The remaining part of the adhesive is allowed to gradually cure. Thus, an initial bond strength is achieved with ease, while preventing the adhesive from spreading beyond the region of application.

DESCRIPTION OF THE PREFERRED EMBODIMENTS

The preferred embodiments of the present invention will now be described with reference to the drawings.

Figure 1:
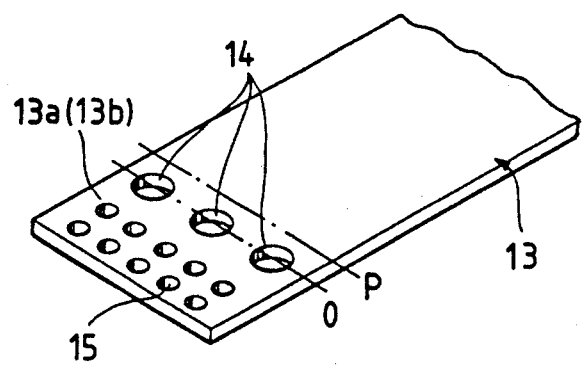
FIG. 1 is an enlarged, perspective view showing in detail the portion at either end of an elastic support member of a pickup device according to one embodiment of the present invention.
Figure 2:
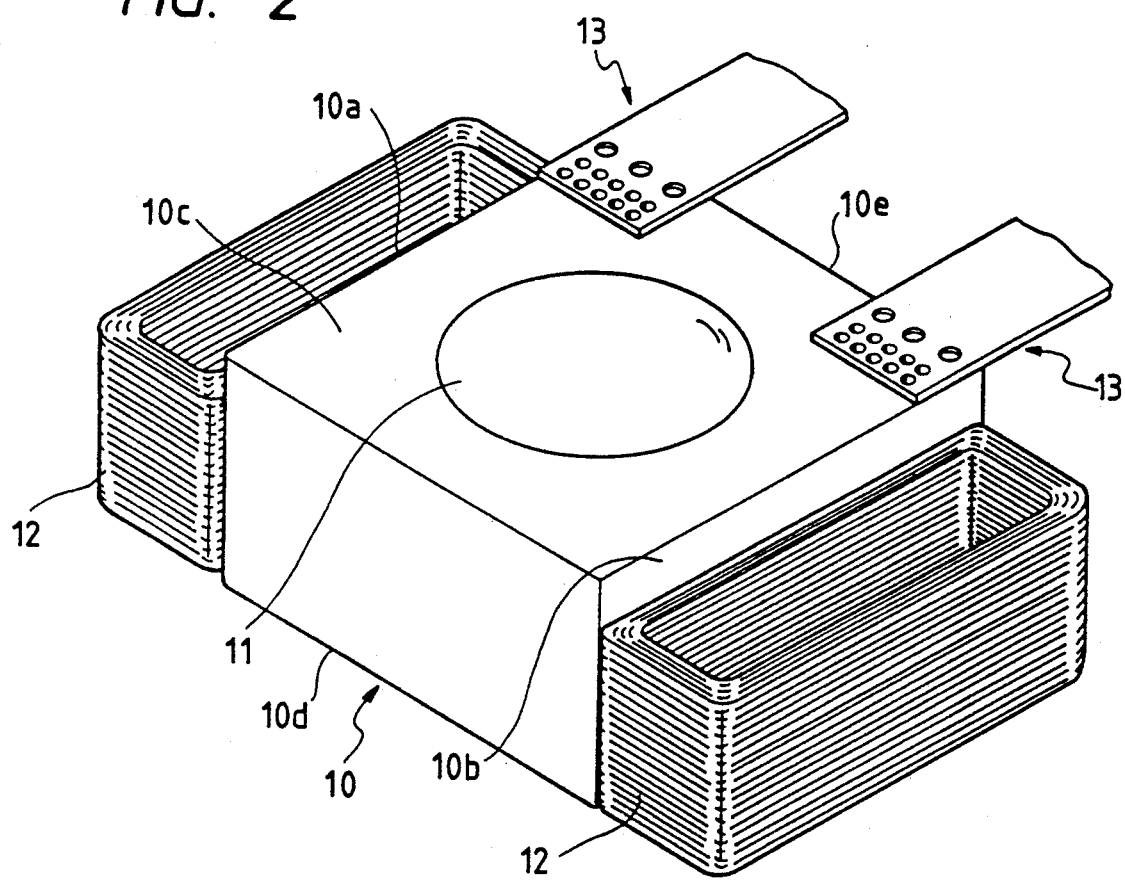
FIG. 2 is a fragmentary perspective view showing in detail the outer appearance of a pickup body of the pickup device.

FIGS. 1 and 2 show an embodiment of the present invention in which the basic structure of the pickup device is substantially the same as that of the conventional device. The pickup device according to the present invention is distinguished in that the arrangement of the pickup body and the elastic support members is different. Therefore, the following descriptions will be given mainly with respect to those component parts.

Figure 6:
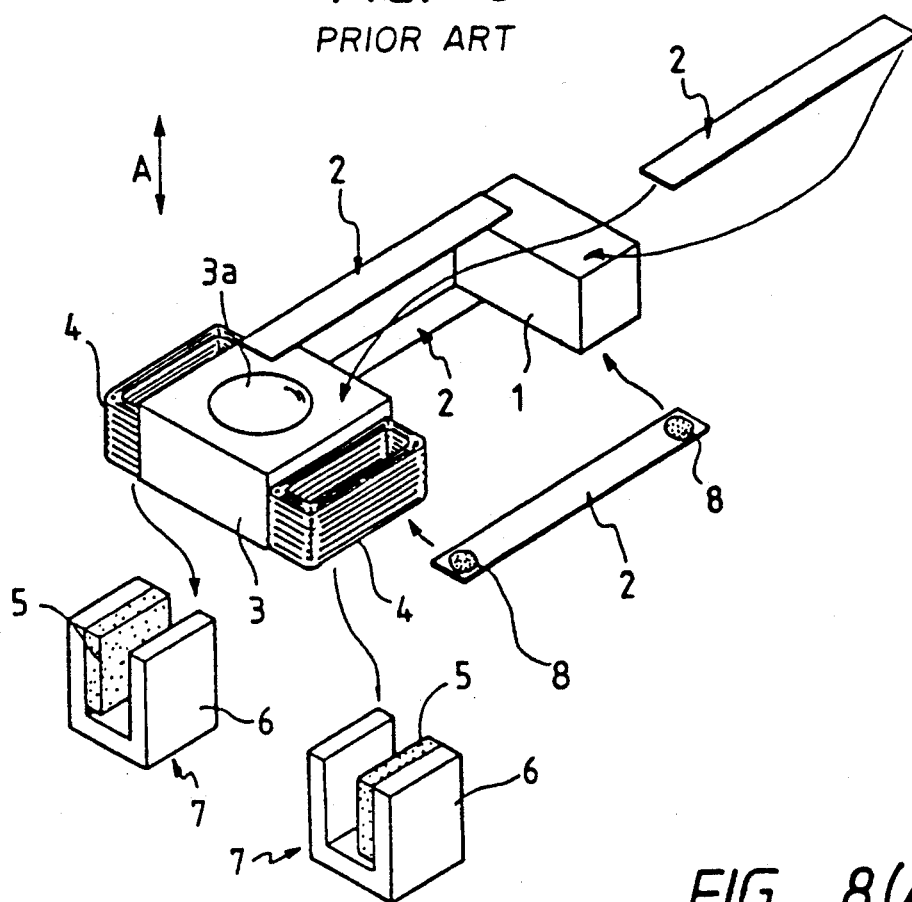
FIG. 6 is an exploded perspective view of a conventional pickup device.
Figure 7:
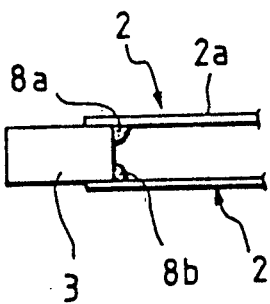
FIG. 7 is a fragmentary side view of a pickup body of the conventional device.
Figure 8A:
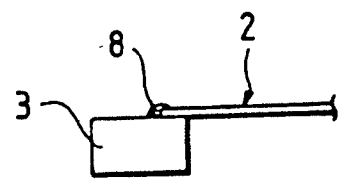
FIG. 8A is a side view showing a securing portion where an elastic support member of the conventional device is secured to the pickup body.
Figure 8B:
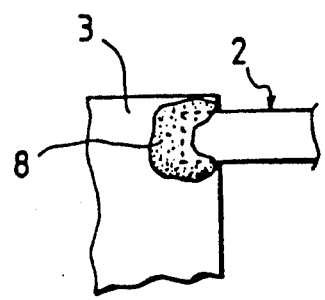
FIG. 8B is an enlarged top view of the securing portion shown in FIG. 8A.

Referring to FIG. 2, a pickup body 10 is substantially shaped like a rectangular parallelepiped. The pickup body 10 has an objective lens 11 disposed in the center of the upper (as viewed in FIG. 2) surface 10c of the body 10 so that a laser beam, radiated onto an optical disk (not shown) disposed above the upper surface, becomes incident on the objective lens 11. A pair of focusing windings 12, similar to those of the conventional device, are mounted on two opposing side surfaces 10a and 10b of the pickup body 10, and they are used to control the movement of the pickup body 10 in the arrow A direction (see FIG. 6).

The pickup body 10 is movably supported by four elastic support members 13, such as spring members, whose respective first end portions are secured to the upper and lower surfaces 10c and 10d of the pickup body 10 (in FIG. 2, the two elastic support members secured to the lower surface 10d are not shown).

Each of the elastic support 13 has an elongated plate shape, and has portions 13a and 13b at either thereof. As shown in FIG. 1, each end portion 13a or 13b has a plurality of through holes 14 (three in this embodiment) formed in the vicinity of the boundary P between a stationary portion of the respective end portion 13a or 13b of the member 13 and a displaceable portion of the member 13. The boundary P specified here is a straight line defined at the intersection of the plane including a side surface 10e (shown in FIG. 2) and the plane including the elastic support member 13.

As shown in FIG. 1, the through holes 14 are, in this embodiment, circular through holes which are arranged along a straight line 0 parallel to the widthwise direction of the elastic support member 13 (i.e., parallel to the boundary P). Further, a plurality of through holes 15, having a diameter smaller than that of the through holes 14, are formed in an area of the end portion 13a or 13b between the through holes 14 and the respective end portion 13a or 13b of the member 13.

The number of through holes 14 formed in an end portion 13a or 13b is not limited to that in the illustrated embodiment, and is suitably set to a greater or smaller number depending on the viscosity of the adhesive to be used, the width of the elastic support members 13, etc. Further, the through holes 14 and the through holes 15 may have the same dimension.

The assembly of the above-described elastic support members onto the pickup body will be described with reference to FIGS. 3A to 3C.

Figure 3A:
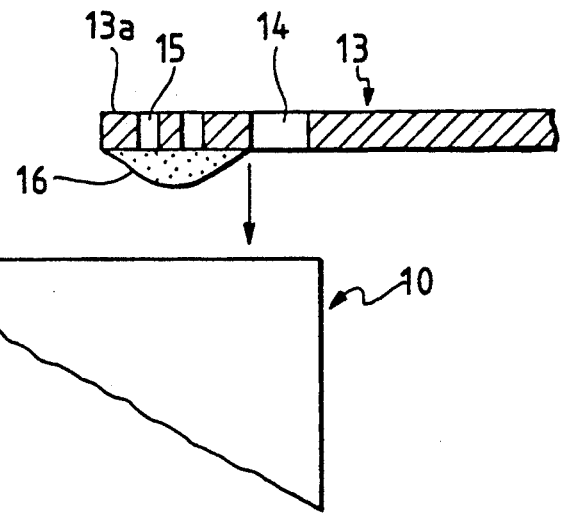
FIGS. 3A to 3C are cross-sectional views that illustrates the process for attaching the elastic support member to the pickup body.

First, as shown in FIG. 3A, an end portion 13a of an elastic support member 13 is positioned above (as viewed in FIG. 3A) the pickup body 10, and an ultraviolet-curing adhesive 16 is applied to a part of the lower surface of the member 13 facing the pickup body 10.

Figure 3B:
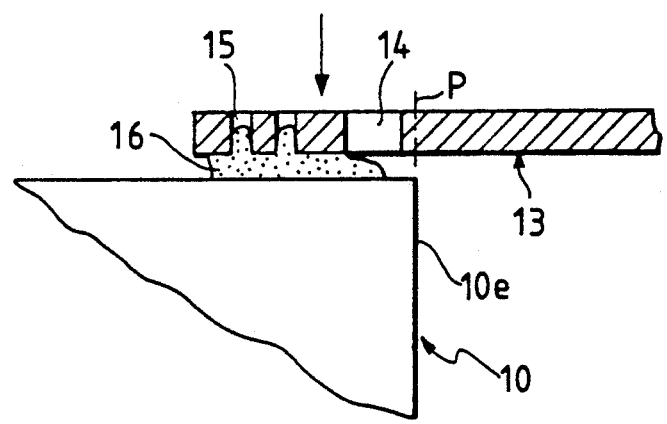

Subsequently, as shown in FIG. 3B, the elastic support member 13 is bonded, under pressure, to a predetermined position of the upper surface 10c of the pickup body 10. In this process, as the applied pressure increases, a part of the adhesive 16 between the upper surface 10c and the lower surface of the elastic support member 13 spreads in the left-and-right direction (as viewed in FIG. 3B) or in the direction perpendicular to the surface of FIG. 3B, thereby involving the risk that a part of the adhesive 16 may be forced rightward beyond the side surface 10e of the pickup body 10.

Actually, however, as the pressure increases, the part of the adhesive 16 spreading rightward is forced into the through holes 14 positioned above the adhesive 16. As a result, no part of the adhesive 16 spreads rightward beyond the boundary P. Other parts of the adhesive 16 spreading in other directions are similarly forced into the through holes 15. Thus, the adhesive 16 is prevented from spreading beyond a region of the lower surface of the member 13 between the boundary P and an end of the member 13.

Figure 3C:
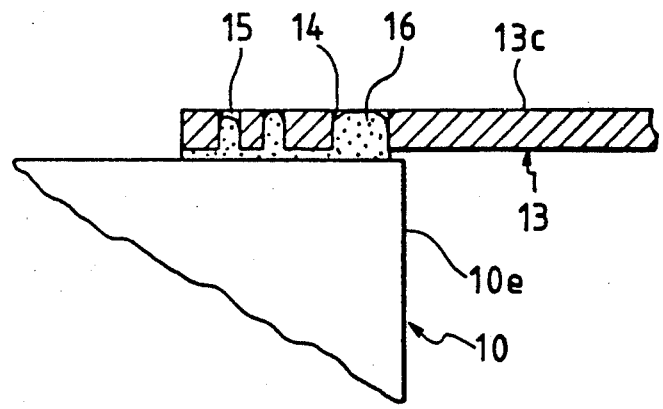

When the state shown in FIG. 3C is achieved, ultraviolet light is radiated from an upper (as viewed in FIG. 3C) position toward the elastic support member 13, thereby causing that part of the adhesive 16 forced into the through holes 14 and 15 to instantaneously cure, and thus provide an initial bond strength. When the initial bond strength is thus achieved, the elastic support members 13 and the pickup body 10 cannot be displaced relative to each other, thereby enabling the subsequent processes to be promptly performed. In addition, in contrast with the conventional practice, the adhesive 16 need not be heaped on the elastic support member 13, thereby avoiding the risk of spoiling the external appearance of the device. In addition, the required amount of adhesive 16 is reduced, thereby reducing the production cost.

A further advantage is that, since no part of the adhesive spreads to the displaceable portion 13c of each elastic support member, it is possible to eliminate the problems entailed by the conventional structure, such as deviation in the center frequency and disturbance of the displacement characteristic that renders the characteristic non-linear. The structure according to the present invention allows the pickup device to be simple and light, as the conventional structure does.

The present invention is not intended to be limited to the above-described embodiment, and various modifications may be made without departing from the spirit of the invention.

Figure 4:
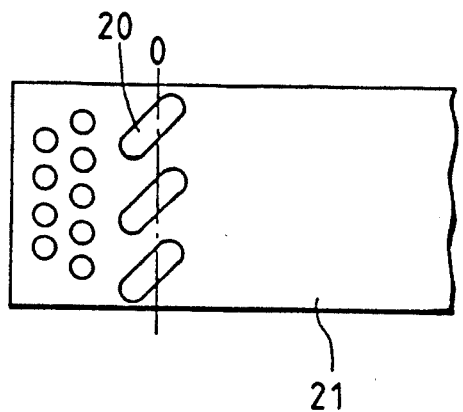
FIGS. 4 and 5 are fragmentary top views corresponding to FIG. 1 and showing other embodiments of the present invention.
Figure 5:
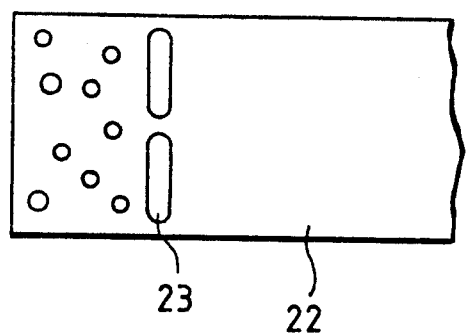

FIGS. 4 and 5 show elastic support members of other embodiments of the present invention.

The elastic support members shown in FIGS. 4 and 5 differ from those in the previous embodiment in the shape and arrangement of the through holes.

In the embodiment shown in FIG. 4, through holes 20 formed in an elastic support member 21 have an elongated shape, and they are arranged on a straight line 0. In the embodiment shown in FIG. 5, through holes 23 formed in an elastic support member 22 have an elongated shape, similar to that of the through holes 20, but the through holes 23 are arranged on a straight line 0 with their major axes aligned with the line 0. A shape that can be adopted as the shape of through holes according to the present invention is not limited to the above-described circular or elongated shape, but may be a star-like or other polygonal shape so long as the shape allows a part of the adhesive to be forced into the through holes so that an initial bond strength is achieved.

Such through holes also assure that effects similar to those of the first embodiment are provided.

As described above, according to the present invention, in a pickup device for a disk player, an initial bond strength can be easily achieved without spoiling the external appearance, and the adhesive can be prevented from spreading from the region of application.

What is claimed is:

1. A pickup device for use with a disk player, said pickup device comprising:

a pickup body disposed in proximity to a disk on said disk player; and a plurality of elongated elastic support members for movably attaching said pickup body to a fixed portion of said disk player, wherein:

a first end portion of each elastic support member is attached with an adhesive to one of said pickup body or said fixed portion;

a second end portion of each elastic support member is attached with an adhesive to the other of said pickup body or said fixed portion; and a plurality of through holes are formed in at least one of said first and second end portions across the width of said at least one of said first or second end portions.

2. A pickup device as in claim 1, wherein said plurality of through holes are formed in a line across the width of said at least one of said first or second end portions.

* * * * *